United States Patent [19]
Fetterman

[11] 3,753,780
[45] Aug. 21, 1973

[54] FLUCTUATION SENSITIVE FUEL CELL REPLENISHMENT CONTROL MEANS

[75] Inventor: Donald L. Fetterman, Fairfax, Va.

[73] Assignee: The United States of America as represented by the Secretary of the Army, Washington, D.C.

[22] Filed: Sept. 30, 1971

[21] Appl. No.: 185,009

[52] U.S. Cl. ............................................. 136/86 B
[51] Int. Cl. ......................................... H01m 27/12
[58] Field of Search ........................ 136/86 B, 86 R

[56] References Cited
UNITED STATES PATENTS
3,600,229   8/1971   Torkildsen ...................... 136/86 B
3,580,741   5/1971   Hovious et al. .................. 136/86 B
3,471,337  10/1969   Fetterman ....................... 136/86 B Primary Examiner—A. B. Curtis
Assistant Examiner—H. A. Feeley
Attorney—Harry M. Saragovitz, Edward J. Kelly et al.

[57] ABSTRACT

This invention relates, in general, to electrical energy source regulation means and in particular, to means for replenishment of selected energy sources, such as fuel cells, having a voltage-load function characteristic curve which must be maintained at all load levels for optimum performance of the system. In this invention, electronic control means adapted to sense minute fluctuations in the output voltage and load current serve to actuate replenishment means, as appropriate, to maintain the voltage level per each load point on the characteristic curve.

3 Claims, 4 Drawing Figures

INVENTOR
Donald L. Fetterman
BY Harry M. Saragovitz
Edward J. Kelly
Herbert Berl
Glenn S. Ovrevik

FLUCTUATION SENSITIVE FUEL CELL REPLENISHMENT CONTROL MEANS

BACKGROUND OF THE INVENTION

Energy sources of the fuel cell variety are characterized by an output voltage curve which declines in accordance with load current. That is, with a heavy current load on the fuel cell, a need for reactant fluid replenishment arises. While it has been found that the degree of replenishment (amount of fluid and time period required) can be determined with respect to a lower voltage level, it is recognized that some perturbation about the lower level may occur due to changes in the reactant availability or other parameters such as temperature, pressure, etc. In view of the variable voltage factor, it will be appreciated that standard voltage regulators which are sensitive to deviations from only one predetermined voltage level normally are not employed to replenish energy sources of the fuel cell variety. In short term, predictable circumstances, it has been found that a controlled periodic replenishment is generally sufficient to maintain the voltage-work function characteristic curve. In other circumstances, it is necessary to employ a relatively expensive means for monitoring ambient conditions, as well as voltage and current levels and to continuously compute active fluid replenishment needs.

My U. S. Pat. No. 3,471,337, which issued 7 October 1969, teaches that the replenishment means may be controlled by sensing the output voltage and the output current on the voltage-load function characteristic curve. It has been found that my invention described and claimed in the aforesaid U. S. Patent, is especially useful in applications where the characteristic curve is expected to remain constant over an extended period of time. However, as the slope voltage-load function curve changes with deterioration of the efficiency of the fuel cell, it will be recognized that my earlier invention, disclosed in the aforesaid patent, must be readjusted to compensate for such changes.

SUMMARY OF THE INVENTION

It has been recognized that a low cost reliable means for monitoring fuel cell operation and for controlling replenishment of the fuel cell, on demand, which does not require readjustment as the slope of the voltage-load function curve changes, is needed, and the present invention has evolved to meet this need.

The present invention utilizes the fuel cell, itself, as the sensing device and the on-off control of the replenishment means is essentially determined by the sawtooth fluctuation of the output characteristic curve.

DESCRIPTION OF THE PREFERRED EMBODIMENT

Figure 1:
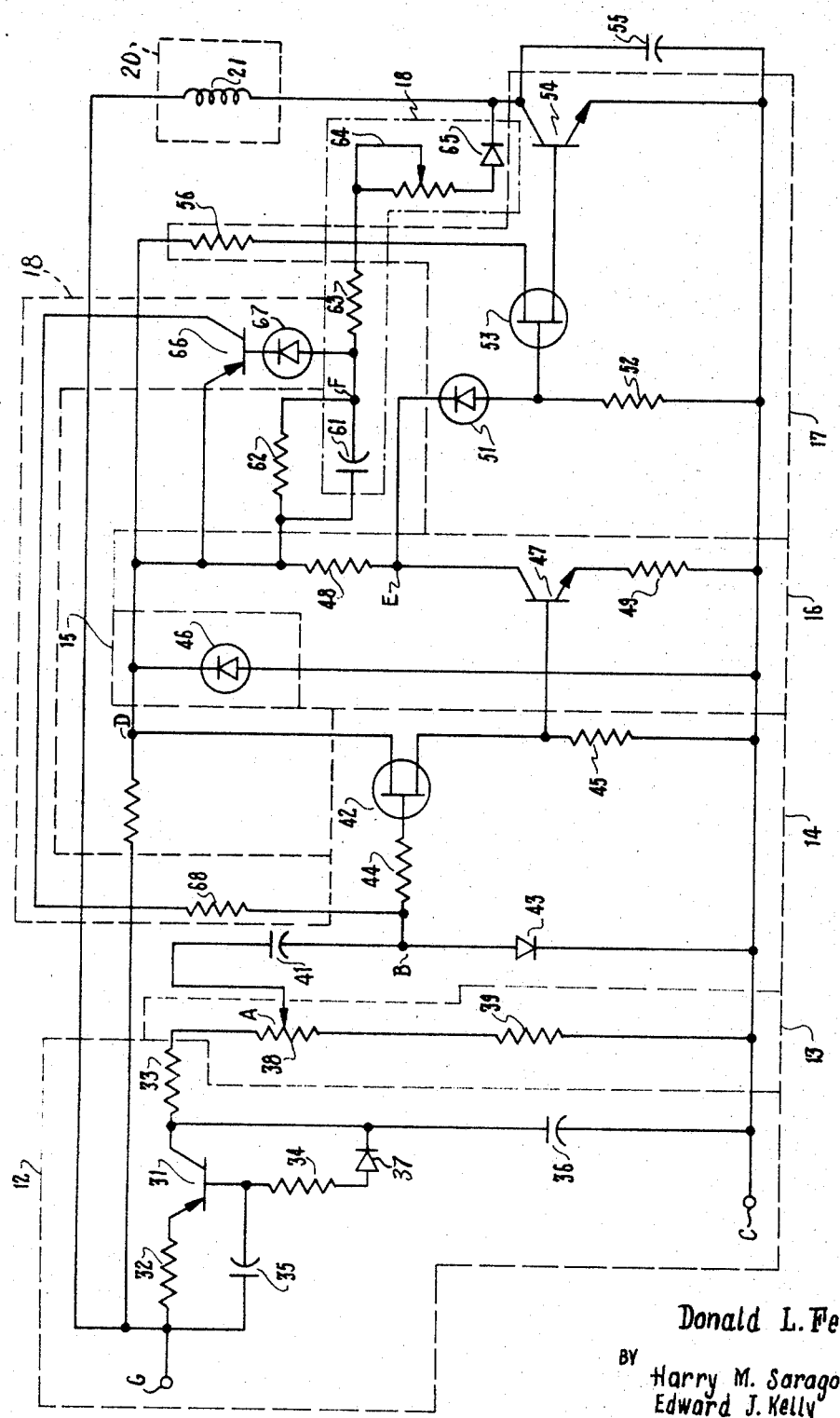
FIG. 1 is a schematic showing of one embodiment of the invention.

As shown in FIG. 1, the device of this invention is connected across the positive and negative terminals of the fuel cell energy source 11. In essence, the embodiment of FIG. 1 comprises an active filter means 12, a voltage divider 13, a differentiating network 14, a regulated voltage means 15, an inverter means 16, a trigger driver means 17, a timing circuit 18, a differentiator reset circuit 19, and a hydrazine supply means, indicated at 20.

It will be appreciated that loading of the fuel cell in some applications may reflect outside oscillations and transients back into the fuel cell output. The active filter means 12, is provided as an isolation means to eliminate undesirable external load disturbance of the reactant feed control means of this invention, namely, all transients and oscillations above one hertz.

The active filter means 12 may consist of transistor 31, for example, a 2N2905 transistor; resistances 32, 33, 34; capacitors 35, 36 and diode 37, which may be a 1N2071. In a typical embodiment, the resistances 32, 33 and 34 may be 510K and 100K ohms, respectively. Likewise, the capacitors 35 and 36 may be rated 20 ufd 12V, and 47 ufd 35V, respectively.

The voltage divider 13, which may consist of resistors 38 and 39, 5K ohms and 2K ohms respectively, is connected across the output of the active filter means 12. The tap on resistor 38 may be fixed or variable dependent upon the anticipated use of the control means. In essence, the voltage divider 13 affords a sensitivity control which must be variable, of course, if the contol means is to be used with fuel cells of substantially different sensitivity.

In the illustrated embodiment of this invention, the voltage taken across resistor 39 and a portion of 38 is applied to a differentiating network 14 which consists of coupling capacitor 41, field effect transistor 42, 2N4222, for example, diode 43 and resistors 44 and 45, 1 megohm and 3.3K ohms, respectively. The RC differentiating network 14, provides a voltage output, taken across resistance 45, which is representative of the instantaneous slope of the saw-tooth wave form of the voltage-work function characteristic curve.

Figure 2:
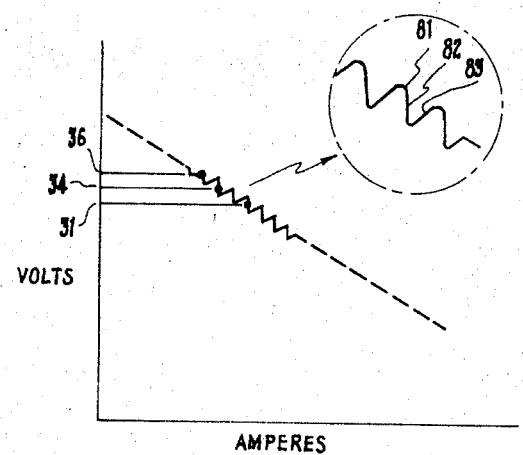
FIG. 2 is a voltage-load function characteristic curve for a typical 5 KW fuel cell.

Referring now to the voltage-work function characteristic curve shown in FIG. 2, it will be seen that the average curve normally considered in analysis of a fuel cell's performance may be represented in the form of blunt saw-tooth fluctuations. Each fluctuation (see inset enlargement) is representative of: (1) the no load, steady state condition of the fuel cell, that is, the blunt top portion 81; (2) the period during which the fuel cell is utilizing available fuel, that is, the negative slope portion 82; and (3) the period during which fuel is being introduced to the fuel cell, that is, the positive slope portion 83.

In operational analysis of one portion of the voltage differentiator action, the fuel cell is in a steady state condition with no load on the fuel cell, and over a period of time, the capacitor 41 of the differentiating network 14 becomes fully charged as a consequence of minute leakage current. Thus, the voltage at point A on the voltage divider 13 gradually becomes a positive voltage representative of the fuel cell output voltage and the voltage at point B becomes negative with respect point A. With the capacitor 41 fully charged, effectively no current flows therethrough, of course, no transistor 42 gate voltage deviations occur, and the voltage drop across the resistance 45 is produced solely by the source-drain current through the transistor 42. Normally, with capacitor 41 fully charged, the point C and the point B are at the same potential, zero volts. Thus, with no load on the fuel cell and zero gate voltage on the transistor 42, the source-drain current of transistor 42 is of sufficient magnitude to bias the transistor 47 "on," and as will be described in more detail hereinafter, the replenishment means solenoid 21 is not energized.

In accordance with the invention, a voltage regulator means 15 is connected across the source-drain circuit path of the field effect transistor 42 and resistor 45, in series, to insure an appropriate regulated bias voltage for the inverter stage and for use of the voltage at point D elsewhere in the circuitry. While a simple voltage regulator, semiconductor device 46, is shown, it will be appreciated that a variety of different voltage regulation means may be substituted if desired.

In the illustrated embodiment, the inverter 16 consists of a transistor 47, 2N930, for example, with the conductive circuit thereof, emitter-collector path, intermediately connected in series with resistances 48 and 49, which may be 36K ohms and 5.0K ohms respectively, across the regulated voltage supervised by the voltage regulator means 15.

The output of the inverter 16 is taken at point E across the zener diode 51, 1N746 for example, and resistor 52 connected in parallel with the collector-emitter circuit of transistor 47. The trigger driver means 17 consists of the zener diode 51, resistor 52, field effect transistor 53, 2N4351 for example, high current switching transistor 54, 2N1711 for example and spurious high frequency bypass capacitor 55. The high current circuit of switching transistor 54 is connected in series with the inductance of fuel cell reactant supply means input solenoid 21 across the positive and negative terminals G and C, respectively, of the fuel cell energy source, not shown, such that when transistor 54 conducts the means solenoid 21 is energized to replenish the fuel cell by the introduction of additional hydrazine or like fuel.

Thus, with no load on the fuel cell and transistor 47 "on" the voltage at point E is relatively low and the zener diode does not conduct. Consequently, with zero bias voltage across the resistor 52, the field effect transistor 53 does not conduct and likewise the high current transistor 54 does not conduct to energize the reactant supply means solenoid 21.

Again referring to FIG. 2, with a load applied to the fuel cell, the output declines slightly with a slope dependant upon the size of the load and/or the condition of the fuel cell (portion 82 of the saw-tooth fluctuation). With a reduction in voltage across the points A and C, and the capacitor 41 charged to the no load output voltage, a voltage develops across the differentiating network 14 resistance circuit, resistance 44, the relatively high internal resistance of field effect transistor 42 and resistance 45, with point B negative with respect point C. Thus, when the output voltage declines to a set level, the negative bias voltage on transistor 42 reduces the magnitude of the source-drain current and the voltage across the resistance 45 is reduced to cut off the transistor 47.

In turn, with no transistor 47 current flow, the voltage increases at point E and causes the zener diode 51 to conduct. When zener diode 51 conducts, a positive voltage is developed across resistor 52 which turns on field effect transistor 53. As shown in FIG. 1, the source-drain current path of the field effect transistor 53 is connected in series with resistor 56 and the gate-collector circuit of switching transistor 54 across the regulated voltage supervised by the voltage regulation means 15. Thus, with transistor 53 turned on, the switching transistor 54 conducts to energize the fuel solenoid 21. In essence, the fuel solenoid 21 is energized subsequent to application of a load across the fuel cell terminals. The relatively short interval of time after the application of a load before the fuel solenoid 21 is energized is determined by mechanical system transport delays and may be, for example, a one second delay or less.

The timing means 18 is connected to the trigger driver circuit 17 such that energization of the fuel solenoid 21 initiates a voltage build-up across capacitor 61 in the RC time constant series connection of capacitor 61 and resistance 62 in parallel, resistance 63, variable resistance 64 and diode 65. Thus, the time period of the timing circuit begins with initiation of the replenishment action. It will be recognized that the principal purpose of the timing circuit 18 is to determine the normal time period of each replenishment action and that the variable resistance 64 affords an adjustment of this time period. Of course, in a predetermined application of the control system of this invention, the resistance 64 may be fixed, if desired.

In accordance with the invention, when a selected voltage level is developed across the capacitor 61 in the timing circuit 18, a differentiator reset circuit 19, consisting of transistor 66, zener diode 67, and resistance 68, which interconnects the gating circuit of field effect transistor 42 and point F on the RC time constant series connection of timing circuit 18, effectively applies a positive voltage to the gate circuit of the field effect transistor 42. More particularly, when a voltage builds up across the capacitor 61, the voltage across the zener diode 67 increases to a point where it conducts, which gates the transistor 66, which may be a 2N3905, to apply the regulated voltage across resistor 68 and diode 43.

Again referring to FIG. 2, it will be appreciated that the period controlled by the timing circuit 16 is represented by the positive slope portion of the fluctuation, indicated at 83. The period should be sufficient to raise the output voltage of the fuel cell a prescribed amount above the average work function curve, to the no load voltage of the fuel cell.

With a positive gate voltage on the field effect transistor 62, the circuitry responds to bias the inverter 16 "on," which shuts off the trigger driver circuitry 17, which in turn de-energizes the fuel solenoid 21.

With the transistor 54 off in the timing circuit, the capacitor 61 in the timing circuit discharges through the resistance 62 and as the voltage reduces to turn off the transistor 66, the positive voltage on the gating circuit of the field effect transistor 62 is removed. Thus, the negative slope of the instantaneous wave form again produces a negative bias on the field effect transistor 42 and the operational cycle begins again. In a typical case, the capacitor 61 might be rated as 20 ufd 12V and the resistances 62, 63 and 64 as ¼ watt, 36K ohms, 22K ohms and 20K ohms respectively.

Figure 3A:
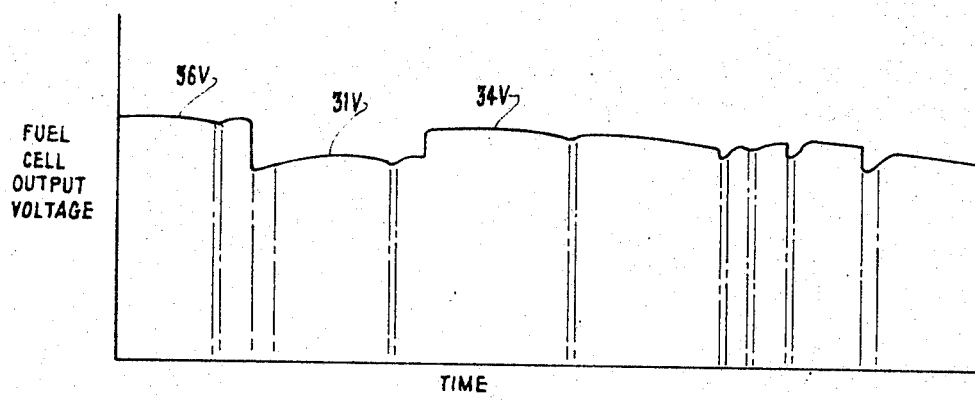
FIGS. 3a and 3b depict the time relation of fuel cell loading, fuel injection and fuel cell response.
Figure 3B:
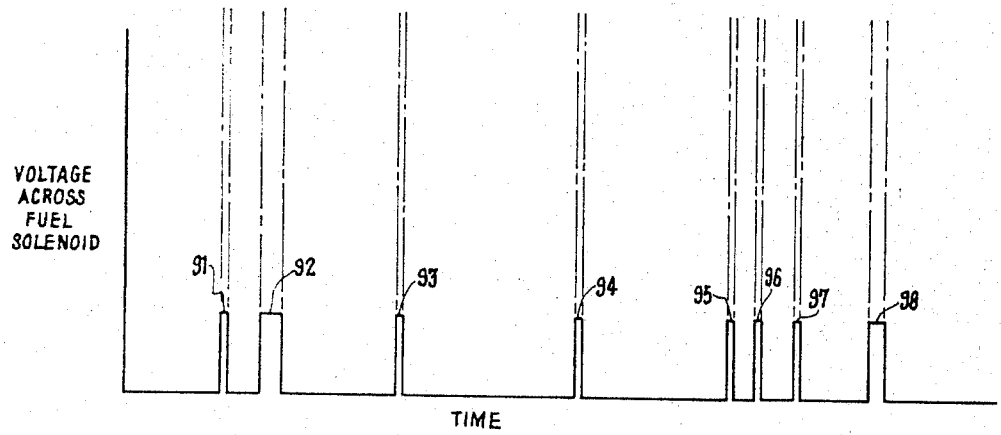

FIGS. 3a and 3b are illustrative of a normal fuel cell operation in accordance with the invention over a determined time period. In particular, FIG. 3a depicts the output voltage of a fuel cell operating under a relatively light load, for example 2.7 amps, subsequent application of a relatively heavy load, for example 5.5 amps, removal of the heavy load with continued light load and reapplication of the heavy load after a determined time period.

FIG. 3b depicts the periodic energization of the fuel solenoid 21 in accordance with output voltage deviation of the fuel cell operating under a relatively light load with several periods of additional loading on the fuel cell.

In FIG. 3b, the narrow spike pulse, indicated at 91, is responsive to the gradual decline of the output voltage (under light load) to a predetermined voltage differential point. The width of the narrow pulse 91 is determined by the response of the fuel cell to the injection of additional fuel with de-energization once the fuel cell output begins to increase. In view of the immediate response of the fuel cell to fuel injection, the solenoid 21 is de-energized without reset action of the time constant circuit in this instance.

The pulse, indicated at 92, is responsive to the application of the relatively heavy load which produces an abrupt decline in the output voltage of the fuel cell which, of course, exceeds the predetermined voltage differential of the replenishment control means. Again, the width of the pulse is determined by the response of the fuel cell to the injection of additional fuel. In the pulse 92 instance, however, the fuel cell is slower to respond and the fuel solenoid 21 is energized for a longer period of time and the representative pulse 92 is much wider. It will be noted that the output voltage level of the fuel cell is approximately 31 volts when operating under a heavier load as compared to 36 volts when operating under the initial lighter load.

Again, as at the 36 volt level, when the voltage gradually declines to a predetermined voltage differential point, the fuel solenoid 21 is energized as indicated at pulse 93 and the length of time of energization is short due to the quick response of the fuel cell.

Upon removal of the heavy load, with continued light load, the output voltage of the fuel cell rises from the 31 volt level to the 34 volt level. No fuel replenishment is required at that point, of course, but as the output voltage gradually declines, the fuel solenoid 21 is energized again for a short period of time to enable replenishment as indicated at 94.

Likewise, in FIG. 3b, the subsequent energization pulses 95, 97 and 98 reflect a fuel replenishment control means reaction to each successive new loading of the fuel cell and the energization pulse 96 is representative of a reaction to a gradual decline of the output voltage of the fuel cell.

As is recognized by persons skilled in the art, most fuel cells deteriorate over a period of time. Deterioration is characterized by a decline in efficiency, that is, the poorer cell performs at a lower efficiency and usually does not respond as rapidly to the introduction of excess fuel. It has been found that the device of this invention, once adjusted, does not require frequent periodic readjustment to compensate for such deterioration and thus may be installed in unattended applications for extended periods of time.

Likewise, the replenishment control means of this invention is readily adaptable to any type of energy source having a significant voltage work function characteristic curve and subject to restoration of output energy level by any additive or conditioning process.

Most important, it has been found that the fuel replenishment means is fail safe in that the fuel solenoid 21 is energized repeatedly, as necessary, and at the same time oversaturation is avoided because the fuel solenoid 21 is de-energized in the absence of a load.

It is understood, of course, that it is within the purview of this disclosure to modify the device of this invention in accordance with standard practice in the art. For example, it is permissible to substitute electron tube or mechanical relay devices for the semiconductors shown or to substitute any other electronic circuitry which performs substantially the same function for each of the variously identified voltage and current responsive interconnected stages of the illustrated embodiment.

Finally, it is understood that this invention is only limited by the scope of the following claims.

I claim:

1. A two output terminal fuel cell operative to produce a voltage output thereacross in combination with a replenishment control means for replenishing said fuel cell while said two output terminals of said fuel cell are connected across an operational load as an energy source therefor wherein said replenishment control means comprises:

a saw-tooth waveform responsive differentiating network having an output voltage waveform which is substantially the derivative of the input voltage waveform, said differentiating network including capacitive means, a first relatively high impedance resistive means and a second relatively low impedance resistive means in series connection, and auxillary means for producing a voltage drop of predetermined magnitude and polarity across said low impedance resistive means with effectively zero voltage drop across said first and second resistive means when said capacitive means is fully charged;

active filter means electrically connected said series connection of said differentiating network across said two output terminals of said fuel cell, said active filter means adapted to reject substantially all frequency variations and transients in the voltage output of said fuel cell due to operational load disturbance;

fuel cell reactant supply means including control means, said control means including solenoid input means adapted to supply reactant to said fuel cell when said solenoid input means is energized by current flow therethrough;

voltage inverter means connected across said low impedance resistive means of said differentiating network such that said inverter means is responsive to said voltage drop thereacross, said voltage inverter means including high current on-off switching means;

means connecting said high current on-off switching means of said voltage inverter means and said solenoid input means of said control means in series across said two output terminals of said fuel cell such that said inverter means is operative to control energization of said solenoid input means;

said on-off switching means adapted to electrically interrupt in response to a predetermined magnitude voltage across said low impedance resistive means and to electrically conduct when said voltage across said low impedance resistive means changes in magnitude;

and reset means connected to said differentiating network and operative to apply a positive voltage drop across said first and second resistive means subsequent to energization of said solenoid input means of said reactant supply means in a timed relation with respect thereto.

2. An assembly as defined in claim 1 wherein said differentiating network includes a field effect transistor, said relative high impedance resistive means is the gate-drain internal resistance thereof and said auxillary means includes the source-drain internal resistance thereof.

3. An assembly as defined in claim 2 wherein said reset means includes an RC time constant network and the time period for charging in said time constant network is initiated coincident with energization of said reactant supply means.

* * * * *